June 27, 1933. G. PIELSTICK 1,915,332

CROSSHEAD GUIDE FOR PISTON MACHINES

Filed April 28, 1931

Inventor
Gustav Pielstick
by Maréchal & Noé
attys

Patented June 27, 1933

1,915,332

UNITED STATES PATENT OFFICE

GUSTAV PIELSTICK, OF AUGSBURG, GERMANY, ASSIGNOR TO MASCHINENFABRIK AUGSBURG-NURNBERG A. G., OF AUGSBURG, GERMANY, A CORPORATION OF GERMANY

CROSSHEAD GUIDE FOR PISTON MACHINES

Application filed April 28, 1931, Serial No. 533,569, and in Germany May 7, 1930.

This invention relates to crosshead guides for piston machines such as internal combustion engines and the like.

Crosshead guides of the character referred to are ordinarily made of cast iron which has a desirable property of little tendency toward corrosion and which is, therefore, adapted to provide a very good bearing surface for the moving parts. In internal combustion engines, and especially multi-cylinder Diesel engines, the crosshead guides must be made very strong to withstand exceedingly high pressures. They have, therefore, been made very heavy, and as there are as many crosshead guides as there are cylinders in the engine it is readily apparent that a reduction in the weight of the crosshead guides would considerably reduce the weight of the entire engine.

It is, therefore, an object of the invention to provide a crosshead guide which is very light in construction and yet has the required strength and which, in Diesel engines, may reduce the weight of the crosshead guide as much as 80%.

Another object of the invention is the provision of a crosshead guide for multi-cylinder Diesel engines and the like, formed of a structure of assembled comparatively thin plates welded together so that a unitary rigid structure is obtained upon which is secured the bearing surface which is adapted to be engaged by the crosshead.

Other objects and advantages of the invention will be apparent from the following discussion, the appended claims and the accompanying drawing, in which Fig. 1 shows a rear elevational view of a crosshead guide embodying the present invention;

Figure 1:
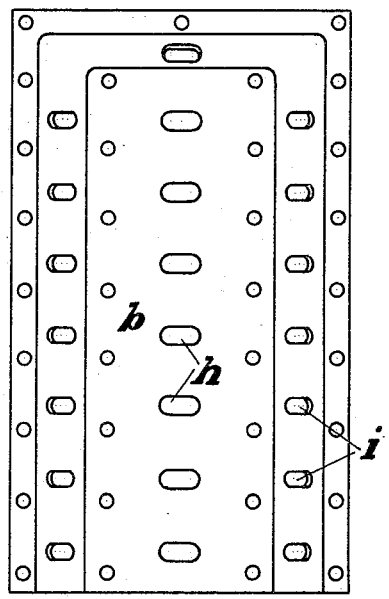
Figure 2:
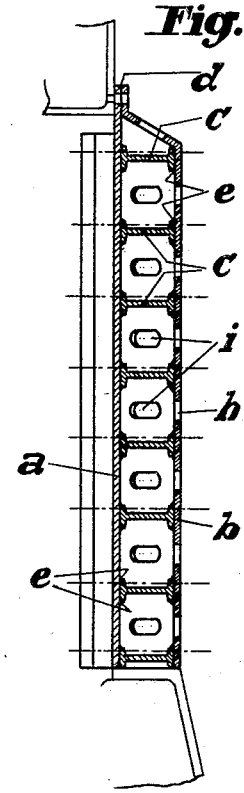
Fig. 2 is a longitudinal section of the same.
Figure 3:
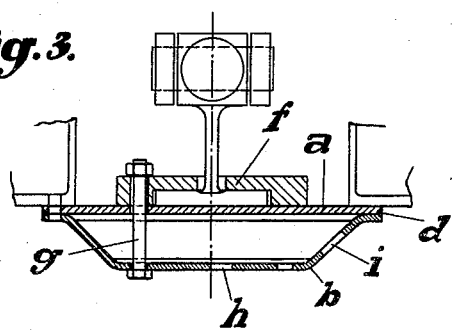
Fig. 3 is a transverse section through the same.

Referring more particularly to the drawing by reference letters like letters designating similar parts in the various views, the crosshead guide of the present invention is constructed of two formed metal plates $a$ and $b$, the latter being dished in such a way as to provide a chamber with plate $a$, in which bracing supports $c$ are provided. The two plates $a$ and $b$ are welded together along their outer edges as indicated at $d$, where they are in direct contact with one another, and where they are supported from the engine frame, and the supports $c$ are welded to the inner surface of the plates $a$ and $b$ as indicated at $e$ in Fig. 2. Between the several supports $c$ there are openings $h$ in the plate $b$ and there are other openings $i$ in the sloping sides of plate $b$, providing access for welding the plates and at the same time reducing the weight of the guide body structure.

Upon the front side of the body structure formed of the plates $a$, $b$ and $c$ are the guideways or bearing members $f$, secured by studs $g$. These studs support the guideways on the front side of the plate $a$, which is entirely free from welds, and greatly reduces the strains upon the welds and reinforces them by tying the plates $a$ and $b$ directly together adjacent the weld locations.

It will now be apparent that the advantages of the cast iron bearing surface may be provided in a structure that is far lighter in weight than a solid cast iron guide, adequate strength being given by reason of the interconnection of the several separate plates in the manner described. Reductions in weight as much as 80% are obtainable in the multi-cylinder engine guides of Diesel engines and the like, as compared to the customary solid cast iron guides of the same size.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A crosshead guide for piston machines of the character described comprising a guide body structure of separate plates welded together and having portions spaced from one another, and a series of interbracing members extending between and welded to said plates and interbracing the spaced portions of said plates together.

2. A crosshead guide for piston machines of the character described comprising a guide body structure formed of separate plates and tie pieces extending between said plates, said plates and tie pieces being welded together, the end portions of said plates being welded directly to one another.

3. A crosshead guide for piston machines of the character described comprising separate plates and tie pieces welded together, the tie pieces spacing intermediate parts of said plates apart, while opposite edges of the plates are connected directly to one another.

4. In a Diesel engine, a crosshead guide comprising a guide body structure of separate plates welded together at their ends, intermediate portions of the plates being spaced from one another, means interbracing said intermediate portions and a crosshead bearing member connected to said body structure.

5. A crosshead guide for piston machines of the character described comprising a guide body structure of oppositely arranged plates, said plates having portions in direct contact and rigidly connected with one another and having other portions spaced from one another, tie plates connecting said first-named plates together, said plates all being welded together to form a rigid structure, bearing members on one side of said body structure, and screw studs extending through the opposing spaced apart portions of said first-named plates and securing said bearing members in place.

6. A crosshead guide for piston machines of the character described comprising a flat metal plate, a dish-shaped plate having its ends welded thereto, tie plates extending therebetween and welded thereto, a crosshead bearing member, and bolts located closely adjacent the tie plates and extending through said bearing member and through said flat plate and said dish-shaped plate.

7. A crosshead guide for multi-cylinder Diesel engines comprising a guide body structure of separate plates having portions spaced from one another, and tie plates extending therebetween, said plates being welded together to form a rigid structure, some of said plates having lightening holes providing access to the interior of the structure, and bearing members bolted to said structure.

In testimony whereof I affix my signature.

GUSTAV PIELSTICK.